United States Patent
Auriol

(10) Patent No.: US 8,727,688 B2
(45) Date of Patent: May 20, 2014

(54) RIVETING ELEMENT AND ASSOCIATED INSTALLATION TOOL

(75) Inventor: Jean-Marc Auriol, Flourens (FR)

(73) Assignee: Eris, Flourens (FR)

( * ) Notice: Subject to any disclaimer, the term of this patent is extended or adjusted under 35 U.S.C. 154(b) by 0 days.

(21) Appl. No.: 13/635,703

(22) PCT Filed: Mar. 2, 2011

(86) PCT No.: PCT/FR2011/050434
§ 371 (c)(1),
(2), (4) Date: Sep. 18, 2012

(87) PCT Pub. No.: WO2011/117502
PCT Pub. Date: Sep. 29, 2011

(65) Prior Publication Data
US 2013/0011212 A1    Jan. 10, 2013

(30) Foreign Application Priority Data
Mar. 26, 2010  (FR) ...................................... 10 52214

(51) Int. Cl.
*F16B 19/08*    (2006.01)
(52) U.S. Cl.
USPC ............................ 411/501; 411/500; 411/502
(58) Field of Classification Search
USPC ............. 411/21, 22, 34, 60.1, 80.1, 450, 500, 411/501, 502, 506, 507, 513, 515, 522
See application file for complete search history.

(56) References Cited

U.S. PATENT DOCUMENTS

| 951,997 | A | * | 3/1910 | Stimpson | 411/502 |
|---|---|---|---|---|---|
| 2,398,532 | A | * | 4/1946 | Keehn | 411/15 |
| 2,451,356 | A | | 10/1948 | Rechton | |
| 3,042,961 | A | | 7/1962 | Tieri | |
| 3,158,058 | A | * | 11/1964 | Marx | 411/502 |
| 3,350,976 | A | * | 11/1967 | Topf | 411/502 |
| 3,526,955 | A | | 9/1970 | Cilione | |
| 4,457,652 | A | * | 7/1984 | Pratt | 411/38 |

FOREIGN PATENT DOCUMENTS

| FR | 1 499 495 A | 10/1967 |
|---|---|---|
| FR | 2 929 666 A1 | 10/2009 |

OTHER PUBLICATIONS

International Search Report, Apr. 29, 2011, from International Phase of the instant application.
French Search Report, Nov. 23, 2010, from corresponding application.

* cited by examiner

*Primary Examiner* — Roberta Delisle
(74) *Attorney, Agent, or Firm* — Jackson Patent Law Office

(57) ABSTRACT

The invention relates to a riveting element (R) for riveting parts which are made from composite materials (M1 and M2) and provided with a through-hole. The invention is characterized in that it consists of: a hollow bushing (200) including, at one end, a head (210) bearing on the surface of one of the parts to be assembled and a hollow rod (220); and a semi-tubular insert (100) including a first end (110) capable of being inserted into the hollow part of the bushing (200) and an open end (130) capable of deforming in order to form an enlarged base that bears on the surface of the other part that is to be assembled once the insert (100) is translatably locked inside the bushing (200). The invention also relates to the installation tool configured for one such element.

10 Claims, 6 Drawing Sheets

RIVETING ELEMENT AND ASSOCIATED INSTALLATION TOOL

FIELD OF APPLICATION OF THE INVENTION

This invention relates to the field of rivets and in particular to the adaptations allowing them to be used for fastening composite materials.

DESCRIPTION OF PRIOR ART

The fastening of composite materials using rivets has diverse stresses, among the following:
- a good resistance to fatigue of the assemblies must be guaranteed,
- damage to the composite material during the installation of the rivet must be avoided,
- the phenomenon of delamination must be avoided,
- the resistance to shearing stresses must be optimised,
- the traction tear-off resistance must be optimised,
- the installation must not require countersinking on the side of the riveting,
- an installation corresponding to that of current solid rivets (via crushing) must be able to be carried out in order to make use of conventional riveting machines,
- the cost must be improved,
- etc.

Although inexpensive, solid rivets are not adapted to the fastening of parts made from composite materials. Indeed, during its crushing, the material of the rivet bears against the corner or edge of the hole in order to form the enlarged base (also called the riveting). This bearing is particularly high in terms of force and has for consequence to cause the phenomenon of delamination due to the high level of radial stresses located in the edge of the hole to appear.

Semi-tubular rivets propose a creation of enlarged base requiring less effort to form the riveting that for a solid rivet but do not propose a resistance to fatigue equivalent to that of a solid rivet.

Finally, blind rivets for fastening structures that provide for crimping make it possible to reach most of the objectives in question but at a particularly high cost in terms of manufacture as well as an installation tool.

DESCRIPTION OF THE INVENTION

Using the specifications that were pre-established by the stresses defined for a fastening in composite materials, the applicant has conducted research that has resulted in the design of a particularly advantageous riveting element.

According to the invention, the riveting element of parts made from composite materials wherein was carried out a through-hole is remarkable in that it is comprised on the one hand
- of a hollow bushing comprising at one end a head bearing on the surface of one of the parts to be assembled and a hollow rod, and on the other hand
- of a semi-tubular insert comprising a first end able to be inserted into the hollow portion of the bushing and an open end able to be deformed for the purposes of forming an enlarged base bearing on the surface of the other part to be assembled once the insert is translatably locked into the bushing.

This characteristic is particularly advantageous in that it combines the advantages of solid rivets with semi-tubular rivets without increasing the cost.

As such, the inflating of the bushing inside of the hole as well as its filling by the insert will make it possible to guarantee the resistance to fatigue as well as good resistance to shearing. Furthermore, the folding of the tubular end of the insert in order to form the enlarged base will allow for the creation of said enlarged base without substantial effort. This enlarged base will not damage the composite material of the elements to be assembled due to the fact that it is formed by the insert and consequently, the walls of the hole are protected by the bushing which receives said insert.

This riveting element is particularly advantageous in that it is the deformation of the insert that makes it possible to obtain the enlarged base while the body of the bushing that remains intact protects the parts made of composite materials from any stress. As such, the insert has a solid end and a recessed end:
- the solid end has two sections allow them to be inserted into the hollow core of the bushing and proposing a shoulder bearing on the bearing surface arranged in the bushing,
- the recessed end has an exterior section and a substantially tapered hollow section which will form the enlarged base bearing on the second portion.

The solid portion of the insert will enter by force into the bushing for the purposes of inflating the fastening inside of the hole in order to ensure good electrical conductivity in particular. Nevertheless, this deformation of the body is very low in order to prevent any phenomenon of delamination. By defining the diameters of the hollow portions and of the solid portions, the inflating of the riveting element is perfectly controlled.

According to another particularly advantageous characteristic, the bushing comprises a recess passing through it axially from one side to the other and having different sections. The head of the bushing has a bore wherein, the end of the insert having a projection for this purpose, is inserted and is fastened once the translation is complete and the enlarged base is formed. In this case, the recess arranged in the bushing is extended into the head so that the end of the insert can be crimped into said head in order to optimise the locking.

More precisely, according to another characteristic, the bushing has at the inlet of the tubular end of its body a tapered section narrowing onto a substantially cylindrical section which is extended into a tapered section arranged in the head and which, of a smaller diameter in relation to the cylindrical section in such a way as to propose an axial bearing to the insert, expands while exiting from said head.

The material of the insert and of the bushing can be chosen from among those in the following list:
- aluminium and aluminium alloys,
- titanium and titanium alloys,
- stainless steel and refractory alloys
- steel, iron and steel alloys,
- copper and copper alloys.

The bushing can adopt the same materials as those of the insert or be made of a different material. This bushing is deformed very little during the installation of the fastening. Also, the applicant is moving towards a titanium/titanium combination and according to a preferred but not restricted embodiment towards a combination of materials where the bushing is made of titanium TA6V and the insert of titanium T40.

The riveting element of the invention shall as such have improved resistance to shearing.

The method of installation of such a riveting element with
- the insert pre-engaged in the bushing,
- a hole passing through the materials to be assembled being made, the bushing being introduced and maintained in the hole with its head bearing against the edges of the end of the hole, consists:

in using a bushing of which the hollow core has two different sections, a first section starting at the distal end having a first diameter and a second section starting at the end of the first section and of lower diameter, said second section exiting from the head, in using an insert that does not have a surface function of axial bearing for the purposes of radial inflating of the bushing in the hole but of which the diameter is able to allow for its housing by force in the two sections, in axially introducing the insert into the bushing in such a way that the latter radially inflates inside of the hole and that the defined recesses are occupied by said insert, in ensuring by means of a riveting pin, a pressure at the end to deform the insert in order to ensure, once the insert locked in the bushing, the folding by centrifugal radial extension.

In addition, given that the folding will start after inflation and that the length of the rod of the bushing corresponds to the thickness of the assembly, the folding of the insert will not exert any stress directly on the edges of the hole protected by the end of the bushing. As such, the edge on the riveting side of the hole passing through the materials to be assembled is protected from any damage. This protection is optimised in that the inner edge of the tubular end of the bushing is chamfered which allows for a start of centrifugal deformation for the insert without the walls of the insert coming into contact against the bushing and push the volume of the latter onto the walls of the edge of the hole.

Another advantage of such a configuration resides in the fact of carrying out only one hole without countersinking in the composite material on the riveting side. The time and the tools for such an operation are therefore no longer required.

Another characteristic participating in the protection of the riveting comes from the fact that the insert does not have any axial surface having for function to deform the bushing which, in its axial movement inside the bushing, makes it possible to only have appear radial deformations. The insert will not pack the material of the bushing in the edge of the riveting. The carrying out of an enlarged base in these good conditions makes it possible to obtain a fastening having a good resistance to pulling off. In addition, the configuration of such a riveting element makes it possible to use the tools that are conventionally used for setting a solid rivet into place.

According to another particularly advantageous characteristic, the method consists in pre-engaging the insert into the open distal end of the bushing prior to the engagement of the riveting element in the hole. This characteristic avoids having to manage the handling of two parts and allows the riveting element of the invention to be used as a solid rivet.

The partial or full inflating of the portion of the bushing placed inside the hole provides a first clamping of the bushing body inside the hole. To do this, the section of the solid end of the insert cooperating with the cylindrical hollow section of the bushing adopts a bulge.

Nevertheless, in order to optimise the fastening, another characteristic of the method consists in continuing the effort until crimping the insert into the recess made in the head which contributes to the creation of a structure fastening with optimised resistance to pulling off.

Indeed, according to a characteristic of the invention, the head of the bushing is also recessed in order to receive an axial projection of an adapted shape of the insert which will allow it to be crimped into the head.

According to another characteristic, the end of the substantially cylindrical and axial projection of the insert which is crimped into the hollow section of the bushing head has the shape of a coaxial cylindrical projection with the rest of the insert and has a recess which will facilitate the crimping by requiring less effort and by authorising the deformation of the material without packing it on the edges of the hole.

Likewise, the crimping can be improved by the exterior arrangement of grooves on the body of the insert.

Another purpose of the invention is constituted by the installation tool. Indeed, the riveting pin used will provide the creation of the enlarged base by deforming the insert, not the bushing.

The installation tool comprises a mobile riveting pin which adopts a profile allowing for the insertion of the insert then the orientation of the deformation of the recessed portion of the insert, once the insert is translatably locked into the bushing.

This riveting pin adopts on its face directed towards the insert projecting and retreating concentric shapes, among the following:

a substantially tapered central protruding shape of which the small diameter allows for its insertion into the hollow portion of the insert and of which the wall directs the deformation towards the exterior, a concentric peripheral groove with a truncated cone of substantially semi-circular section which will direct the deformation of the recessed truncated cone formed by the insert centrifugally and by turning over its edge.

The fundamental concepts of the invention having been exposed hereinabove in their most basic form, other details and characteristics shall appear more clearly when reading the following description and with regards to the annexed drawings, given by way of a non-restrictive example, of an embodiment of a riveting element and of a method for assembling and in accordance with the invention.

DESCRIPTION OF PREFERRED EMBODIMENTS

Figure 1:
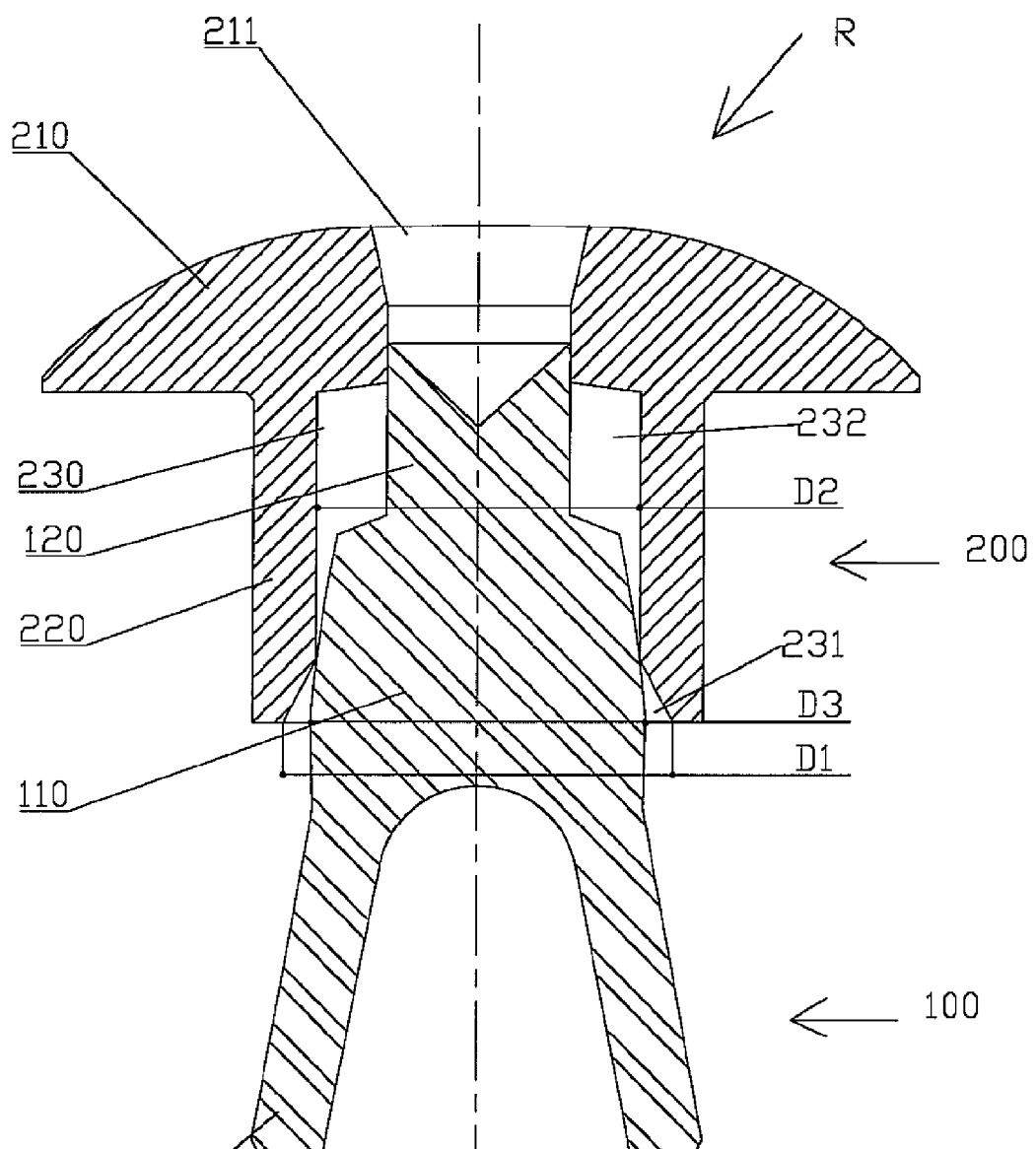
FIG. 1 is a schematic drawing of a cross-section view of the bushing and of the pre-assembled insert of a first embodiment of a riveting element in accordance with the invention.

Such as shown in the drawing in FIG. 1, the riveting element referenced as R throughout comprises two portions:

an insert 100, and a bushing 200 adapted to contain at least partially the insert and having an end provided with a head 210 and a rod 220 comprising an open tubular end in order to receive the insert 100. The outer diameter of the rod allows for its insertion into a hole T passing through the materials M1 and M2 to be assembled.

The hollow core 230 of the rod 220 has two different sections 231 and 232, i.e. substantially cylindrical recess volumes having different diameters, a first section 231 starting from the tubular end 220 having a tapered profile of a first diameter D1. This first section 231 has in fact a tapered profile that facilitates the start of the insertion of the insert. The hollow core 230 of the rod 220 further has a second section 232 starting at the end of the first section 231 and of a smaller diameter D2.

These recesses of different diameters are in adequacy with the insert 100 which, not having a function surface of axial bearing intended for the deformation of the bushing, has a body in several sections of which one 110 of diameter D3 able to allow for its housing without deformation in the first section 231 of the hollow core 230 and to allow for its housing by force in the second section 232 for the purposes of radial inflating of the bushing 100. To do this, this portion of insert has a substantially domed profile.

As such, the section 110 of larger diameter D3 of the insert 100 is less than or slightly greater to the diameter D1 of the first section in order to allow it to be received without effort and without deformation and is larger than that D2 of the second section in order to provoke the deformation of this portion of bushing 200 which will be located inside the hole passing through the parts to be assembled. As shown, the second recessed section of smaller diameter extends until below the head of the bushing.

The riveting element further has a crimping between the bushing and the insert optimised by a recess 211 of the head 210 wherein will be introduced an axial cylindrical projection 120 of the insert 100 of adapted volume and diameter.

The enlarged base is carried out by the insert which comprises a semi-tubular end 130 which, once its body is translatably locked, will be deformed in order to form the second bearing surface against the materials to be assembled.

This hollow end 130 has exteriorly and interiorly a tapered profile expanding towards the exterior.

The riveting element R is presented, as shown in FIGS. 2, 3, 4, 5 and 6, with the insert 100 pre-engaged in the first section 231 of the tubular core 230 of the rod 220 of the bushing 200 so that it can be managed as a solid rivet.

This pre-engaging is maintained by a light clamping between the insert 100 and the first section 231 or via a deformation of the bushing in three points arranged at 120 degrees for the purposes of clamping the insert 100.

As shown, the insert 100 largely extends beyond the bushing 200 in pre-engaged position. The bushing has a rod 220 of a length corresponding substantially to the height of the hole T passing through the materials M1 and M2 to be assembled, i.e. its end comes to be flush with the end of the hole.

The different steps in the assembly implemented by such a riveting element R shall now be described with regards to the drawings in FIGS. 2 to 6.

Figure 2:
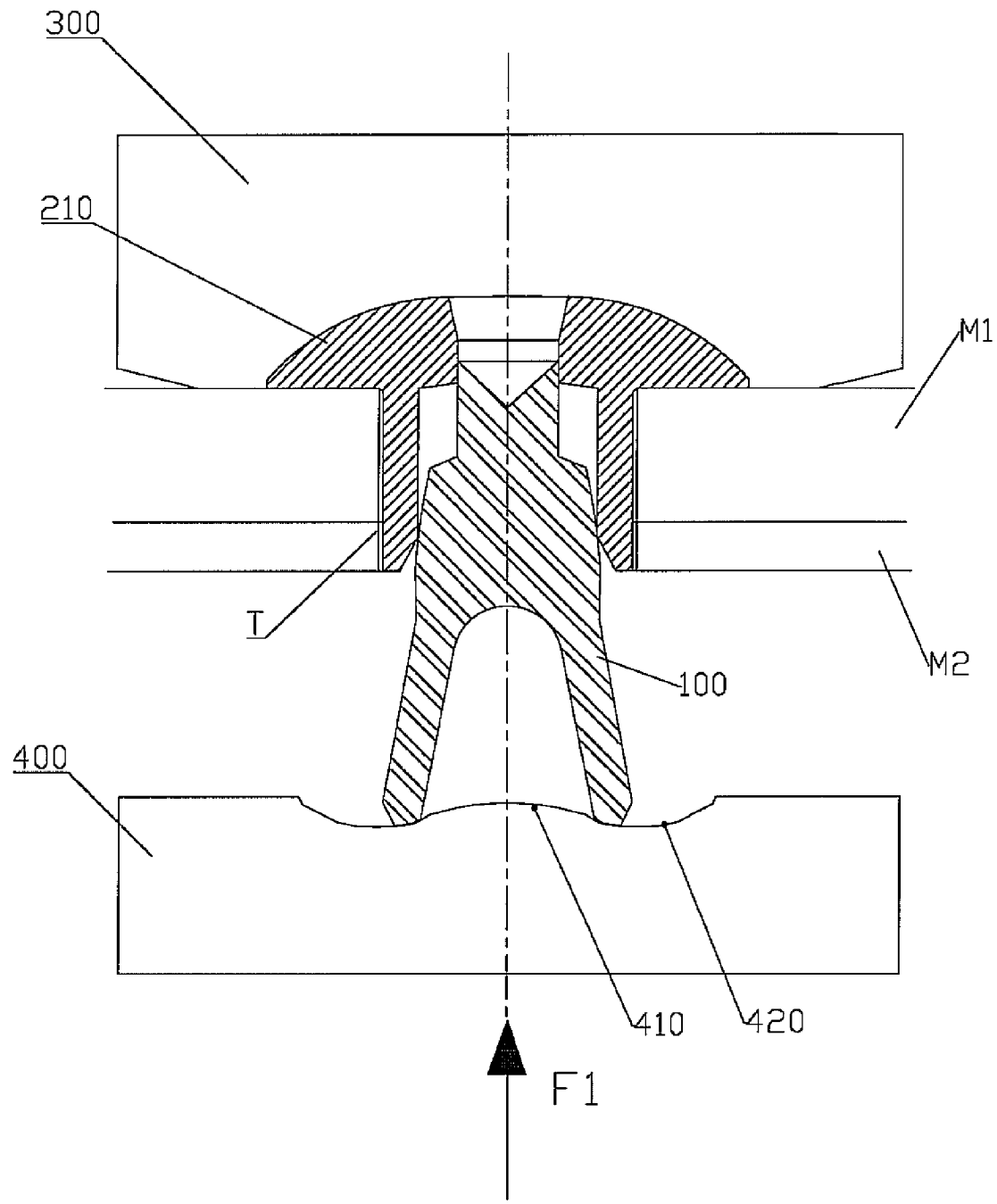
FIGS. 2, 3, 4 and 5 are cross-section views of an assembly showing the installing of the riveting element.

As shown in the drawing in FIG. 2, the riveting element R is arranged inside a hole T passing through two parts made from composite materials M1 and M2 to be assembled. The head 210 of the bushing 200 bears against the exterior surface of M1 around the hole T. The diameter of the hole T is such that the body of the bushing penetrates with clearance inside. In addition, the "foldable" portion of the insert extends beyond the hole T of the side of the part M2.

The head 210 of the bushing 200 is maintained in position by means of a fixed riveting pin 300 and another mobile riveting pin 400 according to the arrow F1 is arranged on the riveting side and bears against the open end 130 of the insert 100 extending beyond the bushing 200. In a movement symbolised by the arrow F1, the mobile riveting pin 400 will exert an axial pressure against the riveting element R for the purposes:
of inserting the insert 100 (FIG. 3),
of expanding the bushing body 200 arranged in the hole T (FIG. 3),
of folding the portion 130 of the insert remaining outside of the hole T (FIGS. 4 and 5),
of crimping the insert into the bushing head (FIGS. 4 and 5).

In accordance with the invention, the installation tool of the riveting element of the invention is remarkable in that it comprises a mobile riveting pin 400 which adopts a profile allowing for the orientation of the deformation of the recessed portion 130 of the insert 100. This riveting pin 400 adopts on its face directed towards the insert 100 projecting and retreating concentric shapes of which:
a substantially tapered protruding central shape 410 of which the small diameter allows it to be inserted into the hollow portion 130 of the insert 100 and of which the wall directs the deformation towards the exterior,
a concentric peripheral groove 420 with a truncated cone 410 of substantially semi-circular section which will direct the deformation of the recessed truncated cone 130 formed by the insert 100 centrifugally and by turning over its edge.

Figure 3:
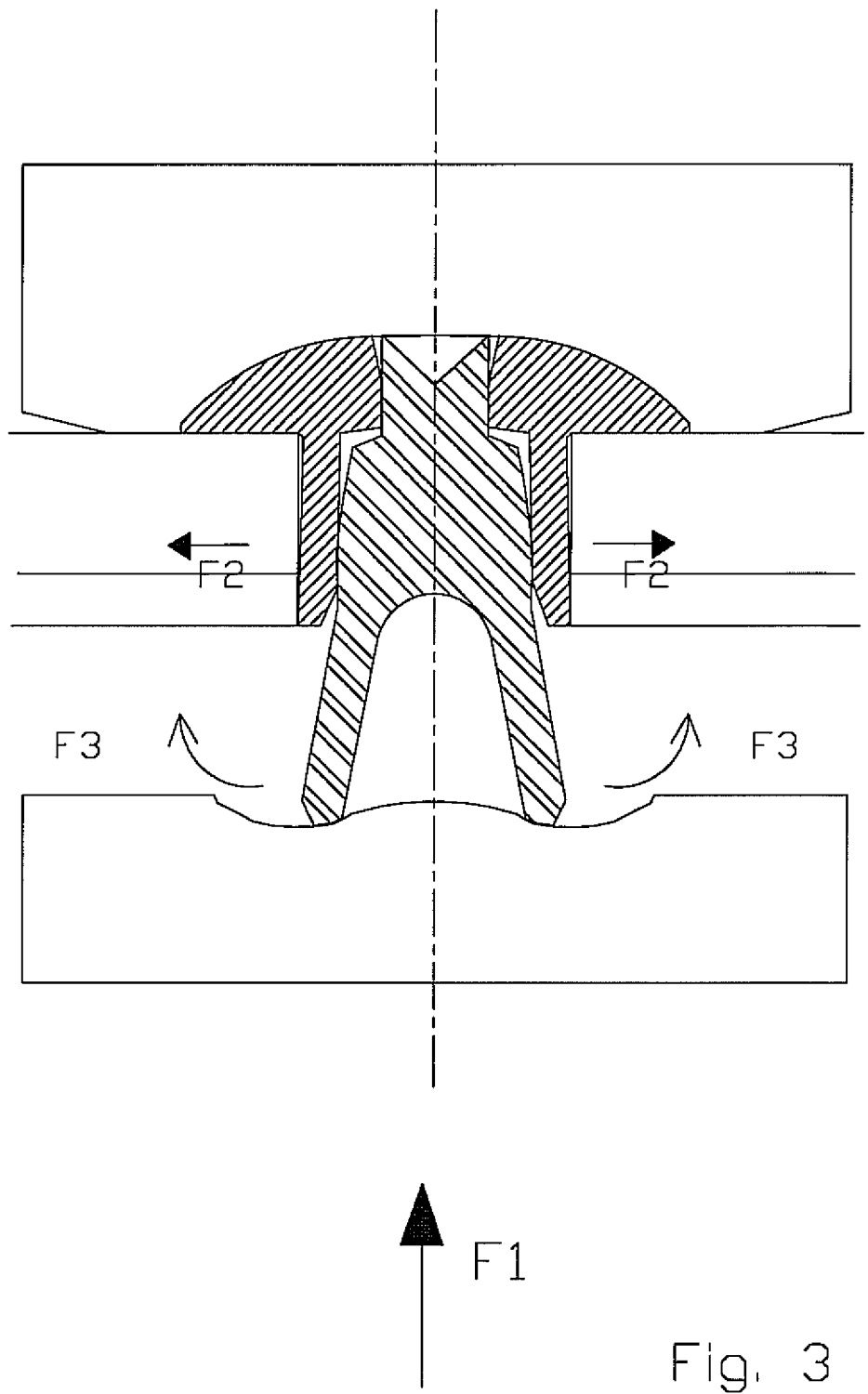
Figure 4:
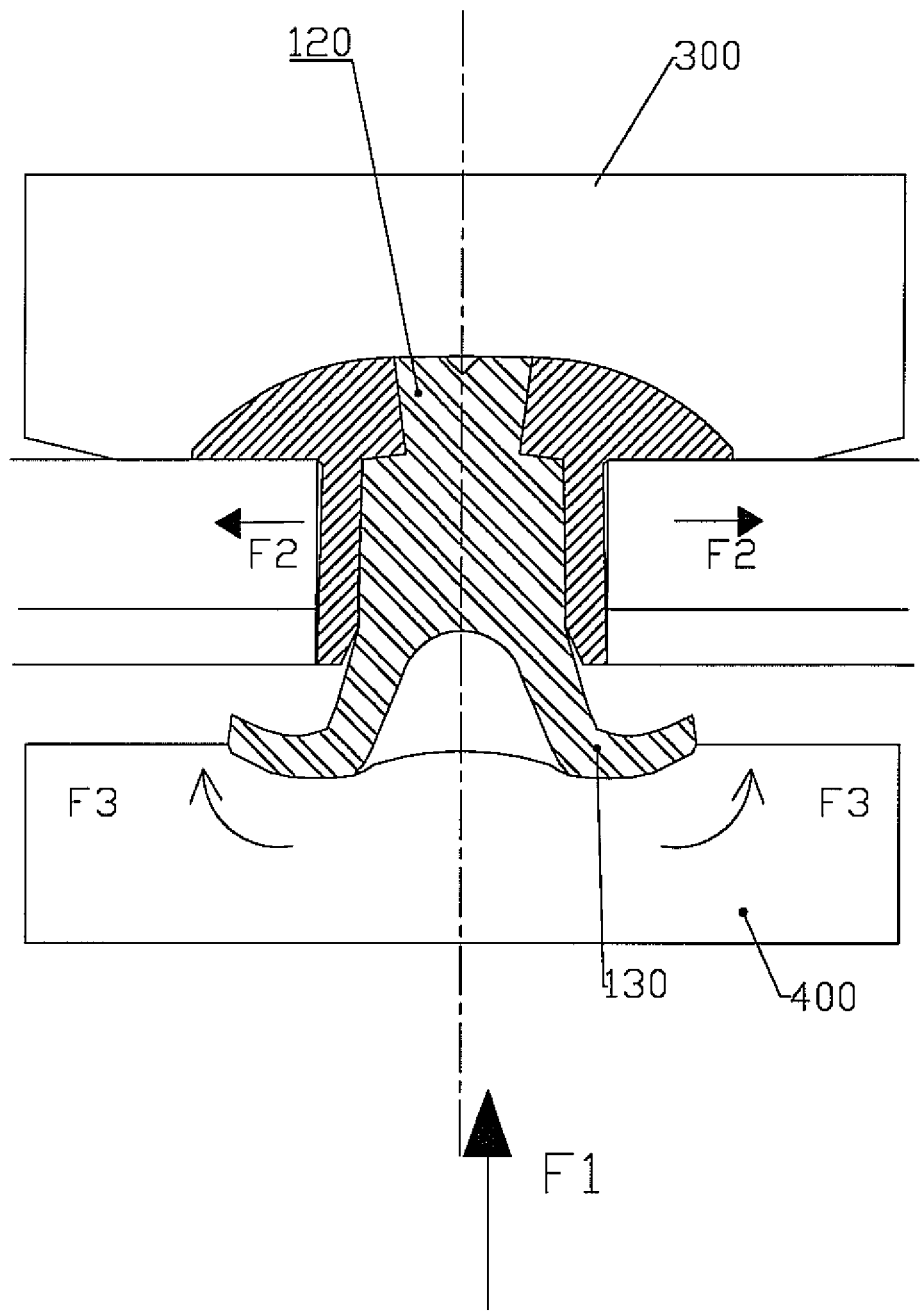
Figure 5:
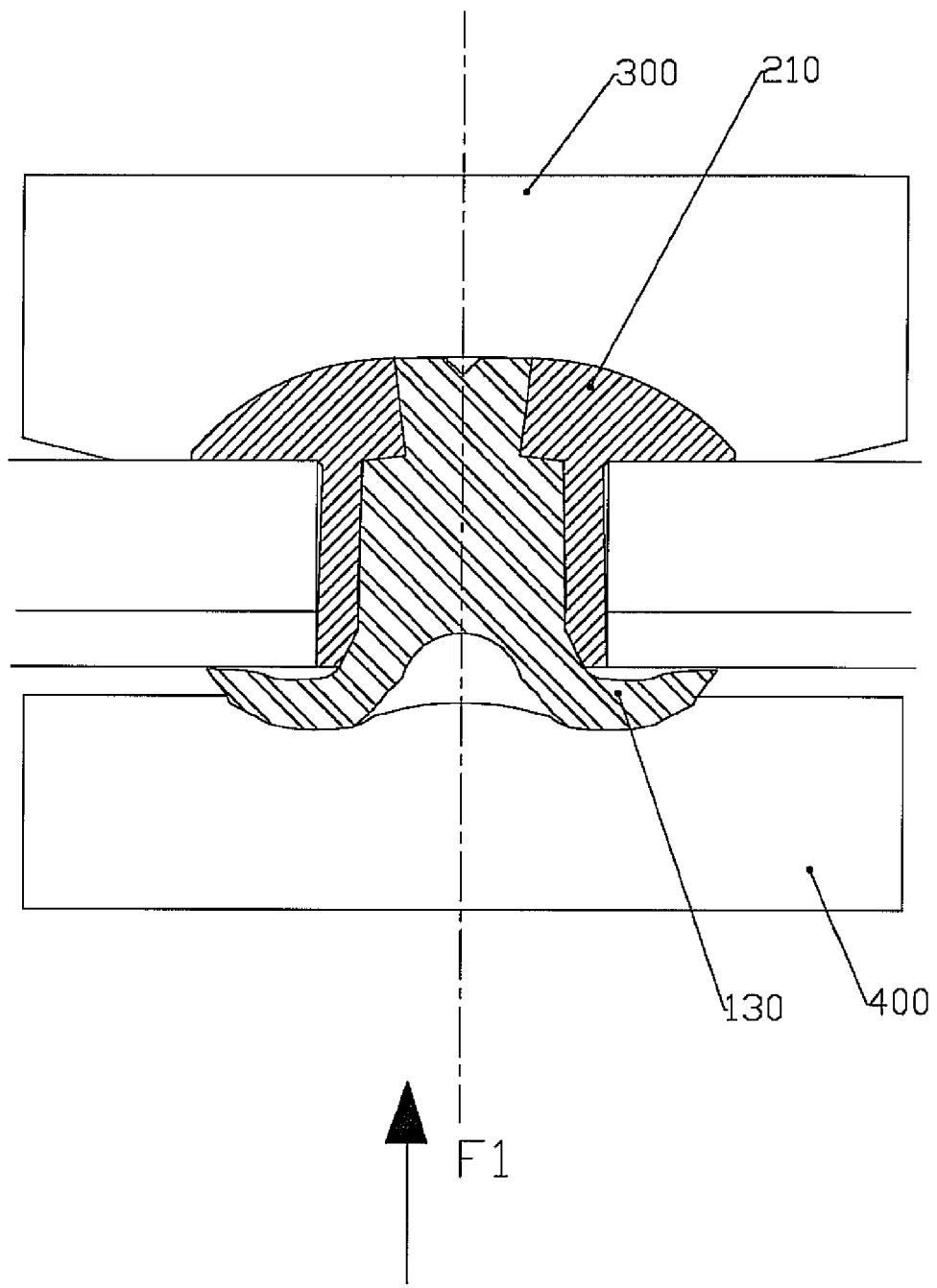

As shown in FIGS. 3 to 5, under the effect of the movement of the mobile riveting pin 400 according to the arrow F1, the insert 100 starts its insertion by force into the portion of bushing body located in the hole T. In accordance with the invention, this insertion has for effect a radial inflating of the bushing, according to the arrows F2, which tends to thrust the exterior walls of the bushing 200 onto the walls of the hole T and to provide the filling in of the space initially existing between the outside periphery of the bushing 200 and the interior surface of the hole T.

As shown in FIG. 4, the advancing of the insert 100 inside the bushing 200 results in the stopping and in the axial stopping of said insert 100 of which the tubular portion 130 will be able to be deformed.

As such, as the interior portion of the bushing 200 is inflated (arrows F2), the exterior portion 130 of the insert is subjected to the pressure of the riveting pin 400 which provokes the centrifugal folding through radial expansion according to the arrows F3 of the exterior portion of the insert 100 (cf. FIG. 4) once the insert is translatably locked.

As shown in the drawing in FIG. 4, while carrying out, through its adapted dimensions the inflating of the portion of the bushing 200 located inside the hole T, the insert 100 occupies all of the interior recess of this portion of bushing 200 thus passing the riveting element R into a configuration of the solid rivet type. Thanks to this configuration, almost all of the exterior surface of the portion of bushing located inside the hole T has undergone an inflating of which the elastic recall will be negligible which makes it possible to maintain radial stresses inside the hole T.

As shown in the drawing in FIG. 5, the continuation of the axial movement of the riveting pin 400 according to the arrow F1 terminates the folding of the insert 100 for the creation of an enlarged base bearing against the part M2 around the hole T.

Figure 6:
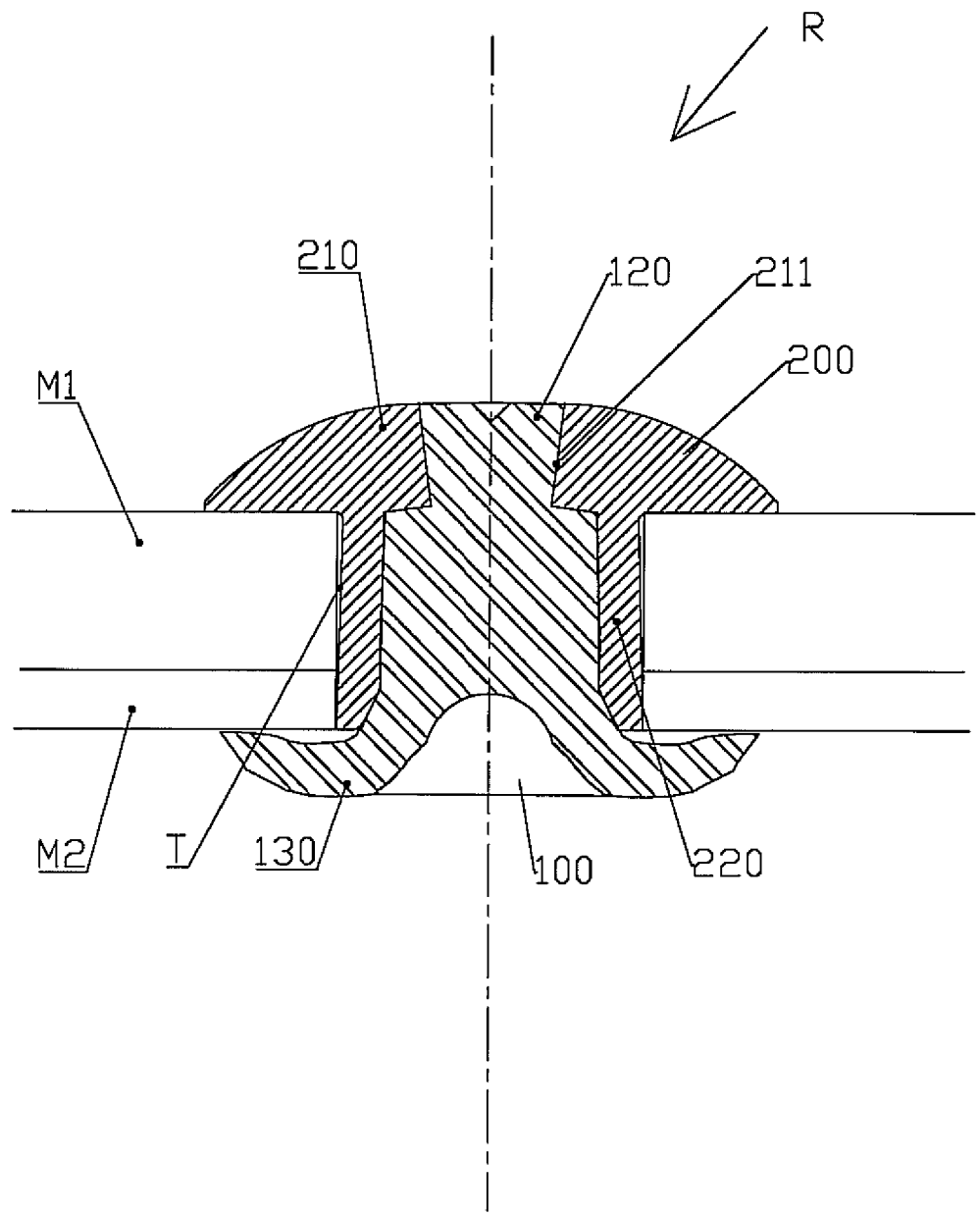
FIG. 6 is a cross-section view of the riveting element once it is in place.

The assembly obtained shown in FIG. 6 shows that the deformed edges of the enlarged base do not bear against the edge of the hole thus avoiding any damage. Indeed, the thickness of the end of the bushing although chamfered interiorly, prevents the insert from bearing directly against the edge of the hole.

The recesses arranged in the two ends of the insert allow for a deformation with less effort.

As shown, the recess arranged in the bushing 200 is extended into the head 210 with a recess 211 expanding into the advancement direction of the insert so that the end of adapted shape 120 of the insert 100 can be crimped into said head 210 in order to optimise the locking. According to the embodiment shown, the section of the recess 211 made in the head 210 is lower than the section of smaller diameter D2 of the recess 230 made in the bushing.

The end 120 of the insert which is crimped into the head by the translation movement symbolised by the arrow F1 has the shape of a coaxial cylindrical projection with the rest of the insert and of which the free end is itself arranged with a recess facilitating its deformation. In order to receive it, the recess 211 made in the head expands in the direction of the progression of the insert in the bushing in order to receive the volume of the deformed material of the end 140 of the insert 100 and as such optimise the locking. It is understood that the methods and riveting elements, which have just been described hereinabove and shown, have been in light of a disclosure rather than a limitation. Of course, diverse arrangements, modifications and improvements can be made to the example hereinabove, without however leaving the scope of the invention.

As such for example, although the embodiment shown shows a rivet arranged with a protruding head, the riveting element can be of the type of that comprising a countersunk head bushing.

The invention claimed is:

1. A riveting element configured to fasten parts made from composite materials in which out a through-hole has been made, the riveting member comprising:
    a head defining a head outer diameter, the head being configured to bear on one of the parts to be fastened;
    a hollow sleeve defining a longitudinal axis, the sleeve including a proximal end integral with the head, and a distal end defining an inner diameter, the hollow sleeve extending from the proximal end, along the longitudinal axis, to the distal end, the hollow sleeve defining an outer diameter less than the head outer diameter; and
    an insert including a first end defining a first outer diameter less than the inner diameter of the distal end, and a second end defining an outer diameter greater than the first outer diameter, the second end being open and defining a tubular shape, wherein the second end is configured to be deformed to form an enlarged base bearing on another one of the parts to be fastened, once the insert is translatably locked into the sleeve.

2. A riveting element according to claim 1 wherein the head defines a recess coaxial with the sleeve, an inner diameter of the recess being less than the inner diameter of the distal end of the sleeve.

3. A riveting element according to claim 1 wherein
    the sleeve defines a tapered section, starting the distal end of the sleeve, narrowing onto a substantially cylindrical section defining an inner diameter,
    the head defines a recess coaxial with the sleeve, an inner diameter of the recess being less than the inner diameter of the distal end of the substantially cylindrical section in order to present an axial bearing to the insert.

4. A riveting element according to claim 3 wherein the recess of the head defines a first inner diameter at a side proximal to the sleeve, and a second inner diameter at a side distal from the sleeve, the first inner diameter being less than the second inner diameter.

5. A riveting element according to claim 1 wherein the head defines a recess coaxial with the sleeve, the recess defining an inner diameter, the first outer diameter of the insert being less than the inner diameter of the recess of the head, the insert further defining a shoulder defining a width greater that the inner diameter of the recess of the head and less than the inner diameter of the distal end of the sleeve.

6. A riveting element according to claim 1 wherein the first end of the insert defines a recess facilitating its deformation of the insert during crimping of the insert into the head.

7. An assembly including a riveting element according to claim 1 and parts made from composite materials in which a through-hole has been made, a length of the sleeve being such that, when the head bears on one of the parts to be fastened, the sleeve is substantially flush with an end of the through-hole.

8. A riveting element according to claim 1 wherein a section of the first end of the insert is configured to bulge.

9. A riveting element according to claim 1 wherein the distal end of the sleeve defines a rim including a beveled surface configured to oppose the insert.

10. A riveting element according to claim 1 wherein the insert defines a second outer diameter, the second outer diameter being larger the inner diameter of distal end of the sleeve, to cause a distortion of the insert when the insert is forced into the sleeve.

* * * * *